May 14, 1963     A. MUSSCHOOT ET AL     3,089,582
VIBRATORY DEVICE
Filed Dec. 19, 1960     2 Sheets-Sheet 1
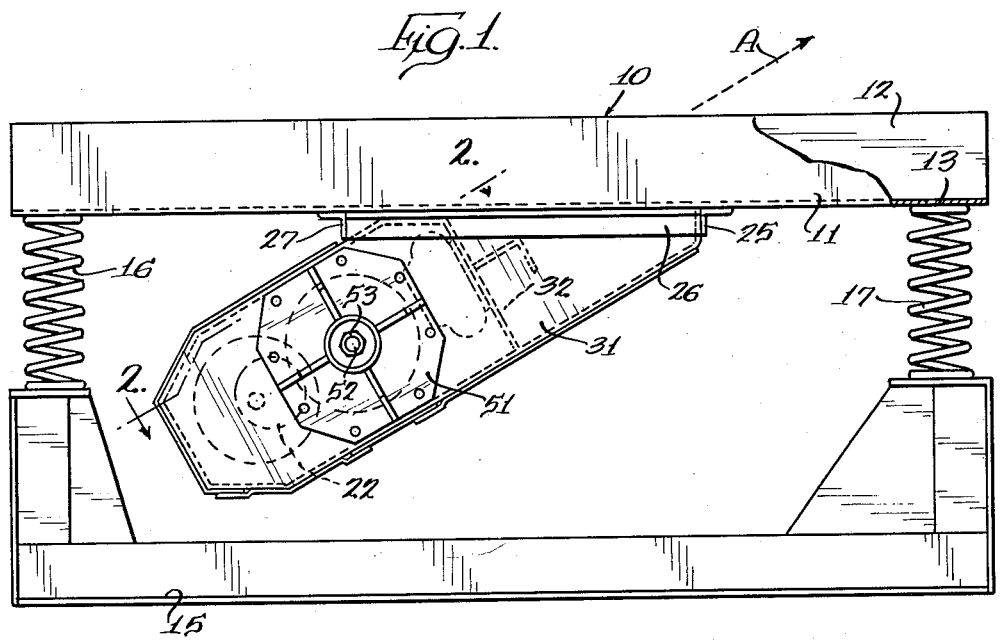
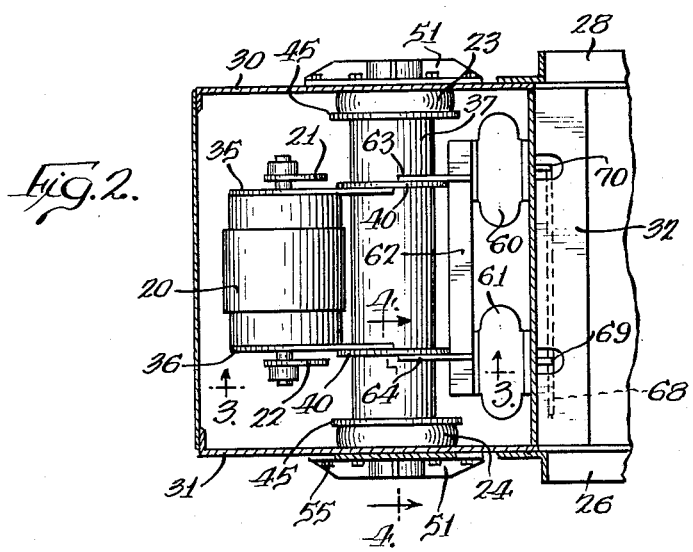
INVENTORS:
Albert Musschoot
Marvin G. Thomson
By Hofgren, Brady,
Wegner, Allen & Stellman
Att'ys 所 # 3,089,582
VIBRATORY DEVICE
Albert Musschoot, Barrington, and Marvin G. Thomson, Prospect Heights, Ill., assignors to General Kinematics Corporation, a corporation of Illinois
Filed Dec. 19, 1960, Ser. No. 76,657
8 Claims. (Cl. 198—220)

This invention relates to a vibratory particulate material moving device and more particularly to such a device embodying a resonant spring-weight system resulting in an amplification of forces to obtain a powerful straight-line vibration.

In the past, there have been vibratory material moving devices utilizing resonant spring-weight systems; however, the prior art devices have found it necessary to provide for guiding of the actuating mass whereby the actuating mass must be confined for generally straight-line movement in order to result in generally straight-line movement of the actuated mass or member.

An object of this invention is to provide a vibratory particulate material moving device in which a resonant spring-weight system provides the vibration of the actuated member and in which the actuating mass is supported from the actuated member in a manner to avoid any necessity for guiding of the actuating mass to obtain substantially straight-line vibration.

Another object of the invention is to provide a vibratory particulate material moving device comprising a first member for moving the material and mounted from a support for vibratory movement, a resonant spring-weight system for vibrating said first member in a generally straight-line path including said first member, a second member having a rotatable eccentric weight and spring means supporting the second member on the first member to transmit force through the spring means in shear resulting in said path of movement for the first member and to torsionally absorb forces of said second member acting transversely to said shear transmitted force whereby the second member may be free of any support other than said spring means.

A further object of the invention is to provide a device as defined in the preceding paragraph in which said spring means is in the form of a rubber member having a toroidal shape which is disposed between the first and second members and which results in no requirement for pressure air as is the case with pneumatic springs. Because pressure air is not required, there is no necessity for a pressure shut off system which is a necessary part of a device using pneumatic springs to prevent the device from destroying itself. An additional object of the invention is to provide a device as defined in the preceding paragraphs in which the device may be given an adjustable spring rate by the addition of pneumatic springs to add to the spring rate of the rubber shear spring and reduce the amplification thus reducing the stroke of the second actuated member.

Further objects and advantages will become apparent from the following detailed description taken in connection with the accompanying drawings in which:

FIG. 1 is a side elevational view of the vibratory particulate material moving device;

FIG. 2 is a section taken generally along the line 2—2 in FIG. 1;

Figure 3:
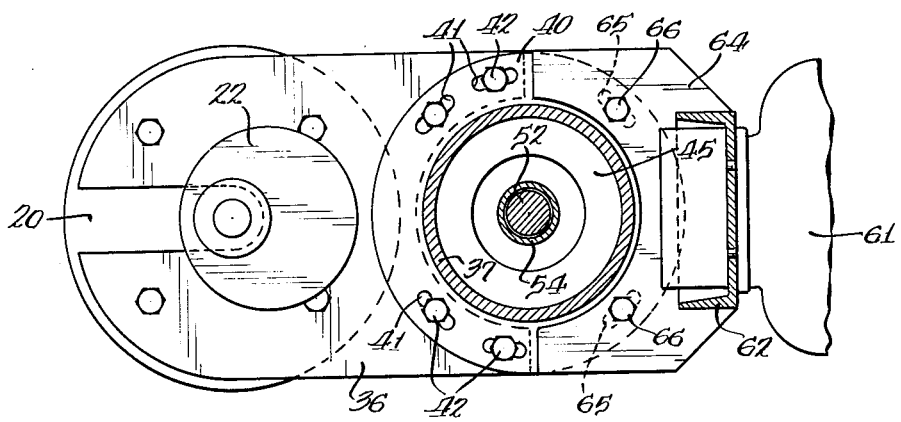
FIG. 3 is a fragmentary section taken generally along the line 3—3 in FIG. 2.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims, it being understood that feeders, conveyers, or screens are all vibratory particulate material moving devices.

As shown in the drawings, the vibratory particulate material moving device of the present invention is illustrated as embodied in a feeder which includes a first member which is vibrated and as disclosed is in the form of a trough indicated generally at 10 having side walls 11 and 12 and an interconnecting bottom panel 13. The trough 10 is mounted resiliently on a fixed support 15 by means of springs located one at each corner of the trough and with springs 16 and 17 being shown at one side of the trough and a corresponding set of springs being positioned at the other side of the trough. With the resilient mounting, the trough 10 may have a vibratory movement along a generally straight-line path as indicated by the arrow A. With the movement of the trough 10 along the vibratory path A, material is advanced at a controlled rate corresponding to the rate of vibration and the device may be used for moving an infinite variety of solid materials with widely varying characteristics from hoppers, bins, silos, storage piles and process machines to conveyors, screens, containers, or other processing steps.

The means for vibrating the trough 10 along the path A comprises a resonant spring-weight system in which one mass is that of the trough 10 and the side members attached thereto and a second mass comprises a motor 20 with a pair of rotating eccentric weights 21 and 22 together with its mounting tube by which it is supported from the trough by a pair of rubber shear springs 23 and 24 to transmit force to the trough 10 generally along the line A through the springs 23 and 24 by means of shear. Forces generated by the rotating weights acting generally transverse to the aforesaid forces are not transmitted to the trough 10, but are torsionally absorbed by the shear springs 23 and 24 to avoid the necessity of guides for the motor 20 and eccentric weights 21 and 22 to restrict the second mass to generally straight-line movement.

More specifically, the underside of the trough 10 has rectangularly disposed channel members indicated at 25, 26, 27 and 28 secured to the trough 10 and forming a structural part thereof to which are attached a pair of side plates 30 and 31 which extend downwardly from the trough at an angle thereto substantially equal to the angle of the path A. The actuated mass including the trough 10, channel members 25—28 and side plates 30 and 31 additionally includes an L-shaped member 32 extending transversely between the side plates 30 and 31 for strengthening the frame and for an additional purpose set forth hereinafter.

Figure 4:
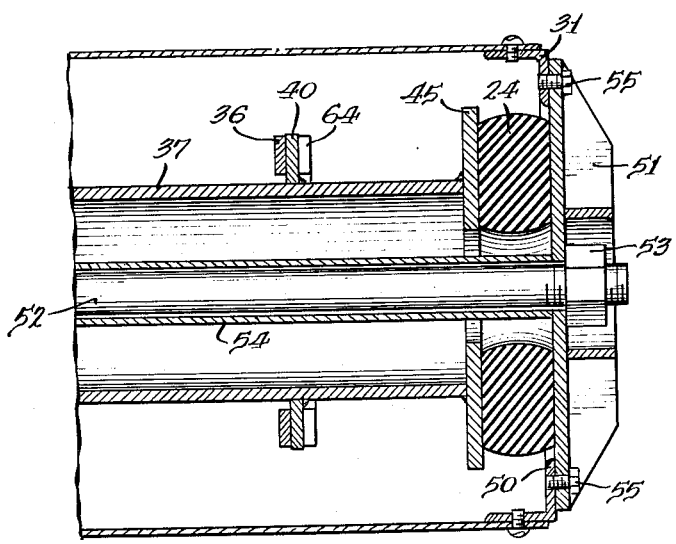
FIG. 4 is a section taken generally along the line 4—4 in FIG. 2.

The motor 20 and rotating eccentric weights 21 and 22 are carried by a second frame including a pair of spaced apart brackets 35 and 36 which are adjustably secured to a transverse member 37 in the form of a tube extending between the side plates 30 and 31 of the first frame connected to the trough 10. The connection of each of the second frame brackets 35 and 36 is the same with the connection of the bracket 36 being shown in FIGS. 3 and 4 in which a flange 40 secured to the tube 37 by suitable means, such as welding, has slotted holes 41 through which bolts 42 extend as well as through openings in the bracket 36 (not shown) whereby the second frame brackets 35 and 36 may be disposed in line with the path A as shown in FIG. 1 and with the axis of rotation of the eccentric weights 21 and 22 and of the tube 37 falling along the path A. The tube 37 thus forms a mounting base for the eccentric weight frame and at each end thereof has a plate 45 which is welded thereto and is associated with the first frame attached to the trough 10 through the pair of rubber shear springs 23 and 24, previously referred to. The mounting of each of the shear springs is the same and reference is herein specifically made to the mounting of shear spring 24, as shown in FIG. 4. The frame side plate 31 is provided with a circular opening 50 in which the shear spring 24 is positioned. A cover plate 51 fits against the frame plate 31 and is drawn thereagainst as well as against the shear spring by means of a bolt 52 extending transversely of the device and having a nut 53 threaded thereon which engages against the cover plate with the inward movement of the cover plate 51 being limited by a transverse tube 54 in which the bolt 52 is positioned. The cover plate 51 is securely attached to the side plate 31 by machine screws 55 connecting these parts.

Rotation of the small exciting eccentric weights 21 and 22 at the correct resonant frequency of the spring-weight system results in an amplification of forces which through shear through the shear springs 23 and 24 results in a powerful conveying vibration of the trough generally along the path A. This substantially straight-line vibration is obtained without guiding action of the eccentric mass because the shear springs 23 and 24 are located at a pivot axis for the actuating mass whereby forces tending to create a moment arm transverse to the desired direction of vibrating force are torsionally absorbed by the shear springs. The rubber shear springs 23 and 24 are of the heavy duty type such as used with heavy earth moving equipment and the spring rate provided thereby may be varied with a thicker spring than that shown, resulting in a softer spring which lowers the spring rate.

In operation, the foregoing structure provides a controlled rate feeder in which the motor 20 is operated to provide rotation of the eccentric weights 21 and 22 to have the system vibrate at a frequency less than the resonant frequency. The system readily adapts itself to increasing weight on the trough 10 by shifting the resonant frequency toward the actual operating frequency which results in increasing the efficiency of the system.

An adjustable rate feeder may be derived from the foregoing construction by the addition of pneumatic spring means with a pair of such springs being indicated at 60 and 61 in engagement with the transverse plate 32 and being supported by a channel member 62 connected to a pair of brackets 63 and 64 which are adjustably connected to the flanges 40 on the tube member 37. The flanges 40 have slotted holes 65 which receive bolts 66 passing through openings in the brackets 63 and 64 to adjustably mount the pneumatic springs relative to the tube member 37. The pneumatic springs 60 and 61 without air pressure therein have substantially no effect in the system; however, as air pressure therein is increased the spring rate of the system is changed to the same extent as if heavier springs 23 and 24 were provided, which thus reduces the stroke of the trough 10. The pneumatic springs 60 and 61 may be supplied with air under pressure from a suitable source through a line 68 extending to the inlets 69 and 70 for the springs.

We claim:

1. A vibratory particulate material moving device comprising, a first member for moving the material and mounted from a support for vibratory movement, a resonant spring-weight system for vibrating said first member in a generally straight-line path including said first member, a second member having a rotatable eccentric weight and torsion spring means supporting the second member on the first member, said torsion spring means having a resistance to movement in shear greater than its resistance to movement in torsion and said spring means being arranged to transmit in shear forces generated by said second member parallel to said path and to torsionally absorb forces of said second member acting transversely to said shear transmitted force whereby the second member may be free of any support other than said spring means.

2. A vibratory device comprising, a first member resiliently mounted for vibration, a second member having a rotatable eccentric mass, and shear spring means having resistance to movement in shear greater than its resistance to movement in torsion, said spring means supporting said second member on the first member and constituting substantially the sole connection between said members, said spring means defining a resonant spring-weight system in which the first member is vibrated in substantially a straight line passing through the axes of said eccentric mass and said shear spring means and transmit to said first member in shear forces generated by said second member parallel to said path.

3. A vibratory particulate material moving device comprising, a first member for moving the material and mounted from a support for vibratory movement, a resonant spring-weight system for vibrating said first member in a generally straight-line path including said first member, a second member having a rotatable eccentric weight and a rubber block constituting shear spring means supporting the second member on the first member, said shear spring means having a resistance to movement in shear greater than its resistance to movement in torsion and said spring means being arranged to transmit in shear forces generated by said second member parallel to said path and to torsionally absorb forces of said second member acting transversely to said shear transmitted force whereby the second member may be free of any support other than said spring means.

4. A vibratory particulate material moving device comprising, a trough mounted for vibratory movement, a frame extending from said trough, a second frame mounting a motor and eccentric weight means driven thereby, and a rubber block disposed between said first and second frames and constituting the support for the second frame to define with said frames a resonant spring-weight system, said rubber block having a resistance to movement in shear greater than its resistance to movement in torsion whereby movement of the second frame in a direction transverse to said generally in-line relation is absorbed in torsion by said rubber block and force of the eccentric weight means in the direction of said in-line relation is transmitted in shear through said rubber block.

5. A vibratory particulate material moving device as defined in claim 4 in which an auxiliary pneumatic spring is positioned between said first and second frames to add to the spring rate of said spring system and reduce the degree of amplification to obtain a shorter stroke of the trough.

6. A vibratory particulate material moving device embodying a resonant spring-weight system comprising, in combination, a support, a vibratory trough resiliently supported relative to said support and having a first frame with a pair of spaced apart plates, a second frame embodying a pair of brackets supporting a motor therebetween with a rotatable eccentric weight at each end thereof, a member extending between the plates of said first frame to which the brackets of said second frame are attached with the motor disposed between the first frame plates, and a rubber shear spring at each end of said member between the member and an adjacent plate of the first frame whereby support of the second frame, motor and member from the first frame exerts force in torsion on the shear spring as do forces created by the eccentric weights acting to create a moment arm about said member and forces acting in line with said first frame are transmitted through said springs in shear to said first frame.

7. A vibratory particulate material moving device as defined in claim 6 in which auxiliary pneumatic springs engage said first frame, and bracket means supporting said pneumatic springs on said member.

8. A vibratory particulate material moving device as defined in claim 7 in which said motor brackets and said bracket means can be rotatably adjusted relative to said member.

References Cited in the file of this patent

UNITED STATES PATENTS

| | | |
|---|---|---|
| 2,771,179 | Musschoot | Nov. 20, 1956 |
| 2,899,044 | Allen | Aug. 11, 1959 |
| 2,925,911 | Parks | Feb. 23, 1960 |
| 2,958,228 | Carrier | Nov. 1, 1960 |
| 2,984,339 | Musschoot | May 16, 1961 |

FOREIGN PATENTS

| | | |
|---|---|---|
| 1,109,272 | France | Jan. 24, 1956 |